(12) United States Patent
Lionetti et al.

(10) Patent No.: US 6,978,669 B2
(45) Date of Patent: Dec. 27, 2005

(54) METHOD AND ASSEMBLY OF SENSOR READY TIRES

(75) Inventors: Robert Edward Lionetti, Bereldange (LU); Robert Lambe, Arlon (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 112 days.

(21) Appl. No.: 10/744,305

(22) Filed: Dec. 22, 2003

(65) Prior Publication Data

US 2005/0132788 A1 Jun. 23, 2005

(51) Int. Cl.$^7$ ................................................ B60C 9/00
(52) U.S. Cl. ........................................................ 73/146.4
(58) Field of Search ................................ 73/146–146.8

(56) References Cited

U.S. PATENT DOCUMENTS

| | | | |
|---|---|---|---|
| 4,160,234 A * | 7/1979 | Karbo et al. ................ | 73/146.5 |
| 5,500,065 A * | 3/1996 | Koch et al. .................... | 156/123 |
| 6,546,982 B1 | 4/2003 | Brown et al. ............. | 152/152.1 |
| 6,734,791 B2 * | 5/2004 | Kelly et al. .................. | 340/445 |
| 2005/0088361 A1 * | 4/2005 | Kelly et al. .................. | 343/873 |
| 2005/0132787 A1 * | 6/2005 | Benedict et al. .............. | 73/146 |
| 2005/0133132 A1 * | 6/2005 | Girard et al. ............. | 152/152.1 |

FOREIGN PATENT DOCUMENTS

| | | | | |
|---|---|---|---|---|
| EP | 1048493 | | 11/2000 | ........... B60C 23/00 |
| EP | 1049196 | | 11/2000 | ............ H01Q 9/16 |
| EP | 1318032 A2 | * | 6/2003 | ........... B60C 23/00 |
| WO | 02/06822 A1 | | 9/2002 | ........... B60C 23/04 |

OTHER PUBLICATIONS

English Abstract for EP 1318032A2.*

* cited by examiner

*Primary Examiner*—Max Noori
(74) *Attorney, Agent, or Firm*—Richard B. O'Planick

(57) ABSTRACT

Apparatus and method for post-cure application of electronics to a tire includes the steps: forming an antenna wire into a predetermined shape having first and second free ends; creating a transponder splice region between the first and second free antenna ends, incorporating transponder splice region identification indicia; curing the antenna wire into a tire during a tire manufacturing procedure; locating the transponder splice region by means of the transponder splice region identification indicia; and splicing the antenna wire ends to a sensor in a post-cure procedure. The transponder splice region identification indicia may include sandwiching a junction box or the overlapped ends of the antenna wire or wires between layers of select material that will not bond to the tire inner liner or antenna cover compounds and incorporating an air pocket in the sandwiched region. Alternatively, or in conjunction with the air pocket, a unique cover layer differentiated by color or other discernible means may be utilized to seal and cover the transponder splice region.

20 Claims, 2 Drawing Sheets

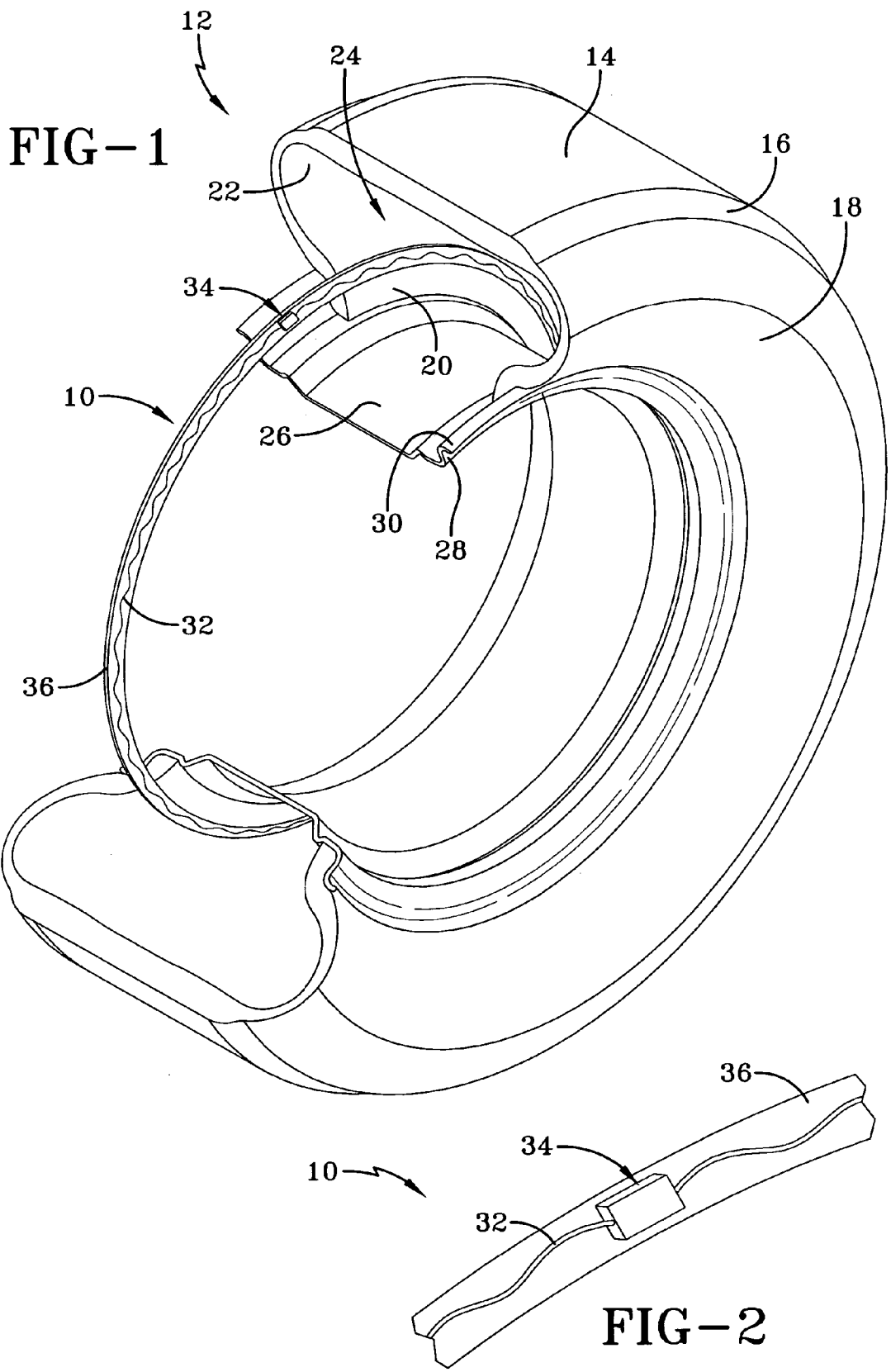

METHOD AND ASSEMBLY OF SENSOR READY TIRES

FIELD OF THE INVENTION

The subject invention relates generally to systems and methods for applying electronics to a tire for the purpose of monitoring tire condition parameters and, more specifically, to an assembly and method for manufacturing a sensor-ready tire so as to facilitate a post-cure incorporation of a sensor in the tire.

BACKGROUND OF THE INVENTION

It is common to employ annular apparatus, including an antenna, for electronically transmitting tire or wheel identification or other data at radio frequency. Sensors used inside tires for the measurement of internal air pressure and temperature or strain sensors require attachment to an antenna that forms a complete circumferential loop within the tire. A complete loop is required for reading and powering the sensor in all tire positions and whether the tire is stationary or rotating. Typically, the apparatus includes a radio-frequency tag, or transponder, comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

The annular antenna is tire-mounted and transmits, at radio frequencies, data from the transponder to a reader mounted on the wheel assembly. The antenna and transponder may be incorporated into a tire during "pre-cure" manufacture of the tire. The integrity of the connection between the tire and antenna is greatly enhanced by a pre-cure assembly procedure. In practice, however, it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. An annular antenna and the electronic tag associated therewith built into the tire in a pre-cure process, therefore, must endure significant stresses that can result in component failure. The electronic tag and the connection between the tag and the antenna, in particular, is vulnerable to damage from the forces imposed from pre-cure assembly to tire.

To avoid damaging the electronic tag or the connection between the tag and the annular antenna during the curing procedure, an alternative known approach is to assemble the tag and antenna into a separate annular apparatus for post-cure attachment to the tire. The annular apparatus may be attached to the tire after the tire is cured by adhesive or other known techniques. While such an approach avoids damaging the tag electronics during tire manufacture, adhesive attachment of the antenna and tag to a tire in a post-cure procedure has certain drawbacks. First, the procedure adds labor, and hence cost, to the manufacturing process. Secondly, the security of the attachment between the annular apparatus and the tire is dependent upon the efficacy of the adhesive system employed. Development of a suitable adhesive that is inexpensive, convenient to use, and durable enough to function throughout the life cycle of a tire has proven problematic.

Accordingly, there remains a need for a system and method of applying tag electronics to a tire that is convenient, cost effective, and reliable. Such a procedure should further ensure the functional safety of the electronics and result in a positive electrical connection between the antenna and tag electronics. Finally, such a procedure ideally would incorporate the advantages, but avoid the shortcomings, of both the pre-cure and post-cure assembly alternatives discussed above.

SUMMARY OF THE INVENTION

Apparatus and method for post-cure application of electronics to a tire is disclosed that achieves the objectives of positively securing an antenna apparatus to a tire while protecting the electronics from the damaging forces attendant tire manufacture. The method comprises the steps: forming an antenna wire into a predetermined shape having first and second free ends; creating a transponder splice region with the first and second free antenna ends, incorporating splice region identification indicia; curing the antenna wire into a tire during a tire manufacturing procedure; locating the splice region by means of the overlap region identification indicia; and splicing the antenna wire ends to a sensor in a post-cure procedure. Pursuant to one aspect of the invention, the method may include the step of forming the antenna wire into an annular configuration and sheathing the antenna within an antenna cover compound. Pursuant to another aspect, the transponder splice region identification indicia comprises overlapping ends of the antenna forming an overlap region. The overlap region may be sandwiched between layers of select material that will not bond to the tire inner liner or antenna cover compounds. A further aspect of the invention includes an air pocket in the sandwiched region by which to facilitate a post-cure location of the overlap region. Another aspect of the invention utilizes the deployment of a unique compound differentiated by color or other discernible means to seal and cover the overlap region. Yet a further aspect of the invention comprises using a rigid body to locate the splice in the tire. The rigid body incorporates electronic and mechanical connection terminals for post application of electronic devices to the splice region.

BRIEF DESCRIPTION OF THE DRAWINGS

The invention will be described by way of example and with reference to the accompanying drawings in which:

FIG. 1 is a perspective view shown partially in section for illustration of a tire having an annular antenna assembly affixed thereto.

FIG. 2 is an enlarged plan view of a portion of the antenna assembly.

DETAILED DESCRIPTION OF THE PREFERRED EMBODIMENTS

Figure 3:
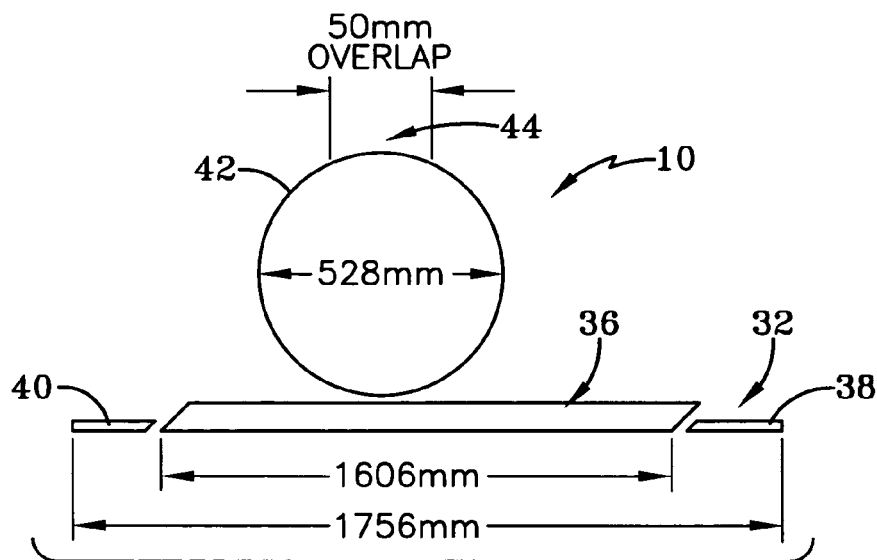
FIG. 3 is a perspective view of the extruded antenna ring and compound.

Referring initially to FIGS. 1 and 2, a preferred embodiment 10 of the subject invention is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange 28 and an outer rim flange surface 30. Rim 26 is conventionally configured and composed of a suitably strong metal such as steel.

An annular antenna 32 is provided and, in the preferred embodiment, embodies a sinusoidal configuration. Antenna 32 may be alternatively configured into alternative patterns or comprise a straight wire(s) if desired and may be filament wire, or cord or stranded wire. Antenna 32 may be incorporated directly into the tire or by means of a carrier strip as described below. Acceptable materials for the wire include steel, aluminum, copper or other electrically conducting wire. As mentioned previously, the wire diameter is not generally considered critical for operation as an antenna and multiple strands of fine wire is preferred. The curvilinear form of antenna 32 provides flexibility and minimizes the risk of breakage during manufacture and use of the tire.

With continued reference to FIGS. 1 and 2, a tag carrier 34 of the general type described above is provided and may include means for sensing tire parameters such as pressure and temperature. Included as a preferred but not necessary part of the apparatus 10 is a carrier strip of material 36 formed into the annular configuration shown. Carrier strip 36 is formed of electrically insulating, preferably semi-rigid elastomeric material common to industry such as rubber or plastic. The strip 36 is formed to substantially encapsulate the antenna wire(s) 32 and at least a portion of the tag carrier 34. In the post manufacturing state shown in FIG. 1, therefore, the apparatus 10 comprises antenna 32, tag carrier 34, and carrier strip 36, in a unitary, generally circular, assembly. The diameter of the apparatus assembly 10 is a function of the size of the tire 12. The preferred location of the antenna assembly 10 on the tire is on the tire just above the rim flange 30. Such a location minimizes stress forces on the assembly from operation of the tire and minimizes interference to RF communication between the tag and an external reader (not shown) that might otherwise be caused by the metal rim. Other mounting locations of the antenna assembly 10 on the tire, however, may be employed if desired for specific tire applications.

From FIG. 1, it will be apparent that an optimal manner for attaching annular assembly 10 to a tire is during the tire manufacturing process. In curing the tire, the assembly 10 will adhere directly to the liner22 and a reliable mechanical connection results. However, for the reasons previously discussed, the tire manufacturing operation can impart significant stress to the tag 70, and/or its leads 72, 74, resulting in a failure of the electronics. The subject invention avoids the possibility of such a failure by attaching the tag 70 to the antenna ring in a post-cure assembly stage.

Figure 4:
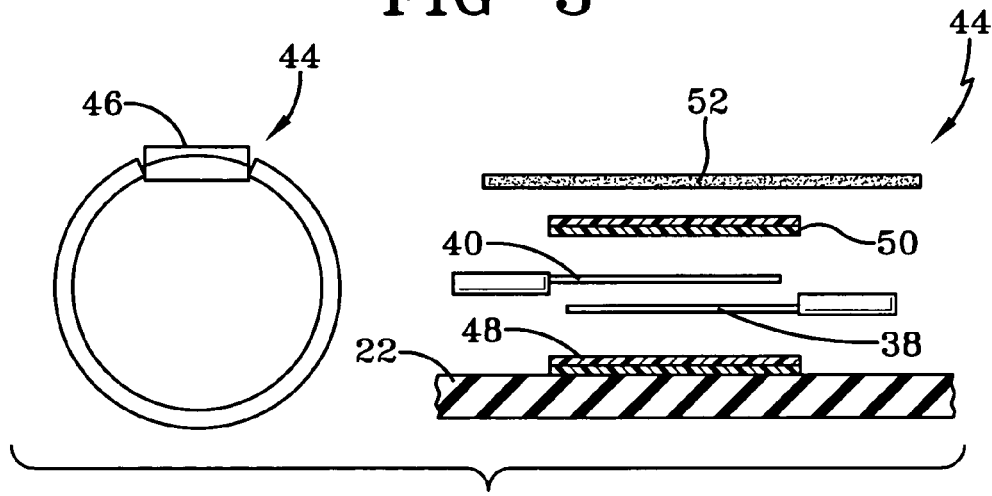
FIG. 4 is a schematic view of the antenna ring formed into an annular configuration and detail of the overlap region layers.

Referring to FIGS. 3 and 4, the invention forms annular apparatus 10 into a loop or ring 42 from antenna wire 32 sheathed by strip 36. Ends of the sheath 36 are stripped and bare ends 38, 40 are brought into overlapping mutual relationship, defining an overlap region 44. The antenna ring 42, composed of steel cord encapsulated in a rubber compound suitable to bond to the tire innerliner material 22 is assembled in a green tire and the sensor or transponder subsequently applied in the cured tire. The ring is made to the appropriate dimension plus an overlap region 44 ranging from approximately 50 to 100 mm. The dimension of the loop and overlap region may vary without departing from the invention. The overlap region can be identified and extracted from the cured tire for application of the sensor by means of the invention.

As shown in FIG. 4, the overlap region 44 is configured by a plurality of layers 46 in a preferred embodiment. The overlap region consisting of antenna ends 38, 40 is sandwiched-in-between two sheets 48, 50 of material, such as Teflon, that does not bond to the innerliner 22 nor antenna compounds. The overlap region can also be identified by means of a different colored compound, such as a white gumstrip layer 52, that seals and covers the overlap region 44. A small amount of air is trapped in the overlap region 44 and crates an air pocket that is easily identified in the cured tire. By making an incision in the air pocket the overlap region 44 is revealed and the Teflon fabric and wire ends can be removed. The sensor 34 can be connected to the antenna ring via ends 38, 40 in a conventional manner. Once connected to the sensor 34, the ring splice may be applied, the excess wire from ends 38, 40 removed, and a sealant applied to the sensor to anchor it to the innerliner surface and seal the exposed antenna wire.

Figure 5:
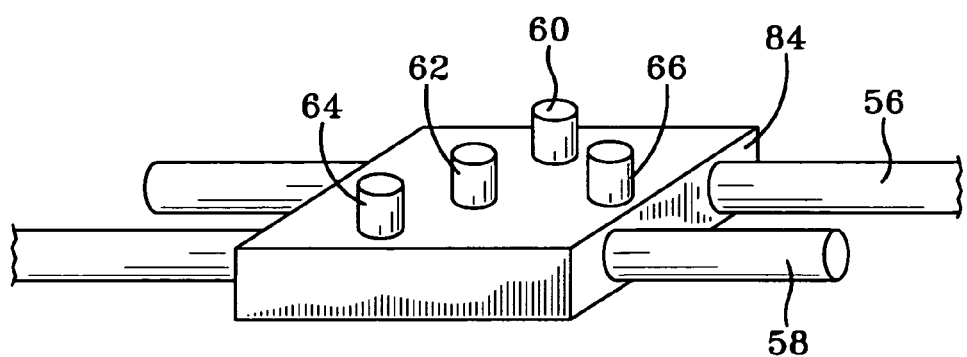
FIG. 5 is a perspective view of an alternative embodiment of the invention in which a rigid body is used to mark the location of a splice region in the antenna loop.

FIG. 5 illustrates an alternative embodiment of the invention in which a rigid body 54 can be used to locate the splice region in the tire. The top surface of the rigid body 54 has a peal off layer of a non-stick material such as Teflon. The body 54 itself is composed of a rigid polymeric material of a known type that will bond to rubber. After curing the body in the tire, the Teflon layer provides the same feature as that provided by the sandwich structure described previously. That is, the Teflon layer traps a small amount of air for location. The antenna ends 56, 58 may be terminated to electronic connection terminals 60, 52, respectively, within the body 54. Mechanical connector posts 64, 66 are further provided in the body 54 and provide the means for engaging electronic package sockets (not shown) whereby establishing an electrical connection between the electronic package and the antenna and a mechanical connection between the electronics package and the body 54. The Teflon layer on the top surface of body 54 further protects electronic and mechanical connection terminals incorporated in the rigid body 54 until post application of the electronic device occurs. When the tag is attached to the rigid body 54, the posts 64, 66 fix the alignment between the tag and body 54 while electrical contact between the antenna and the tag is established via terminals 60, 62. The rigid body 54 thus serves to mark the location of the transponder splice region to allow for a post-cure attachment of the transponder tag to body 54.

In conventional post-cure assembly methods, the annular apparatus 10 may be created as a unitary assembly and post applied to a tire innerliner by using adhesive. Compared to using a cured ring assembly applied by using adhesive, the invention reduces the number of materials and process steps required to apply the assembly to tires and the ring assembly is permanently bonded by chemical cross-linking to the tire innerliner. The process steps for adhesive application typically involves first assembling and curing the antenna ring and sensor assembly, removing the residual mold release agents from the tire innerliner by using solvents and abrasive grinding, applying adhesive, applying the assembly, stitching, and waiting for the adhesive to cure. For the invention, no cleaning or solvents are necessary because a green ring assembly is applied to a green tire before curing and application of mold release agents. No adhesive is required or time for adhesive to cure. Since the rubber is removed from the overlapped area, the uncovered area is not contaminated with release agents. Application of sealant to anchor the sensor and exposed wires is thereby simplified.

As mentioned previously, to achieve a good adhesive bond to the innerliner, grinding or sanding may be necessary to remove traces of the mold release agent that acts as a barrier to adhesion. By using the invention, neither material thickness nor condition of the tire's original innerliner is sacrificed as a result of grinding or sanding. As a result, the tire's capacity to retain air and exhibit intended durability is not compromised.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of manufacturing a tire having a sensor and antenna incorporated therein, the method comprising the steps:
   a. forming an antenna wire into a predetermined shape having first and second free ends;
   b. creating a transponder splice region between the first and second free antenna ends;
   c. incorporating transponder splice region identification indicia;
   d. curing the antenna wire into a tire during a tire manufacturing procedure;
   e. locating the transponder splice region by means of the identification indicia; and
   f. splicing the antenna wire ends to a sensor in a post-cure procedure.

2. A method according to claim 1, wherein the method includes the step of forming the antenna wire into an annular configuration and sheathing the antenna within an antenna cover compound.

3. A method according to claim 1, wherein the step of incorporating transponder splice region identification indicia comprises overlapping ends of the antenna to form an overlap region and at least partially covering the overlap region with at least one layer of select material that will not bond to the tire compound during a tire curing procedure.

4. A method according to claim 3 wherein the select material comprises Teflon fabric.

5. A method according to claim 1, wherein the step of incorporating transponder splice region identification indicia comprises entrapping an air pocket in the transponder splice region by which to facilitate a post-cure location of the transponder splice region.

6. A method according to claim 1, wherein the step of incorporating transponder splice region identification indicia comprises using a differentiated second compound over at least a portion of the transponder splice region.

7. A method according to claim 6 wherein the differentiated second compound is color coded.

8. A method according to claim 1, wherein the step of incorporating transponder splice region identification indicia comprises the steps of interposing a junction box between opposed ends of the antenna; and terminating opposed ends of the antenna to terminal means within the junction box.

9. A sensor-ready tire assembly comprising:
   a. an antenna wire formed into a predetermined shape and having first and second free ends, the free ends being positioned in an opposed orientation to form a transponder splice region;
   b. a tire having the antenna wire cured therein;
   c. transponder splice region identification indicia means marking the transponder splice region for post-cure location identification.

10. A tire assembly according to claim 9, wherein the antenna wire is formed into an annular configuration and sheathed within an antenna cover compound.

11. A tire assembly according to claim 9, wherein the transponder splice region identification indicia means comprises at least one layer of a select secondary material covering at least a portion of the transponder splice region.

12. A tire assembly according to claim 10 wherein the secondary material is selected from a material that does not bond to the tire during a tire curing procedure.

13. A tire assembly according to claim 12 wherein the secondary material is a Teflon fabric.

14. A tire assembly according to claim 9 wherein the transponder splice region identification indicia means comprises a visually discernible air pocket entrapped in the transponder splice region.

15. A tire assembly according to claim 9 wherein the transponder splice region identification indicia means comprises a differentiated second compound over at least a portion of the transponder splice region.

16. A tire assembly according to claim 15 wherein the differentiated second compound is color coded.

17. A tire assembly including at least one sensor and an communication antenna incorporated therein, the assembly being formed by a process comprising the steps:
   a. forming an antenna wire into a predetermined shape having first and second free ends;
   b. creating a transponder splice region between first and second free antenna ends;
   c. incorporating transponder splice region identification indicia;
   d. curing the antenna wire into a tire during a tire manufacturing procedure;
   e. locating the transponder splice region by means of the transponder splice region identification indicia; and
   f. splicing the antenna wire ends to a sensor in a post-cure procedure.

18. A tire assembly according to claim 17, wherein the process includes the step of forming the antenna wire into an annular configuration and sheathing the antenna within an antenna cover compound.

19. A tire assembly according to claim 17, wherein the process includes the step of at least partially covering the transponder splice region with at least one layer of select material that will not bond to the tire compound during a tire curing procedure.

20. A tire assembly according to claim 17, wherein the process includes the step of entrapping an air pocket in the transponder splice region by which to facilitate a post-cure location of the-transponder splice region.

* * * * *